United States Patent [19]
Tanimoto

[11] Patent Number: 6,049,398
[45] Date of Patent: Apr. 11, 2000

[54] FACSIMILE MACHINE HAVING RESOLUTION COMPATIBLE WITH DATA TERMINAL DEVICE

[75] Inventor: Yoshifumi Tanimoto, Nagaokakyo, Japan

[73] Assignee: Murata Kikai Kabushiki Kaisha, Kyoto, Japan

[21] Appl. No.: 09/037,262

[22] Filed: Mar. 9, 1998

[30] Foreign Application Priority Data

Mar. 11, 1997 [JP] Japan ................................... 9-055700

[51] Int. Cl.⁷ ............................................ H04N 1/32
[52] U.S. Cl. ........................... 358/442; 358/444; 358/468
[58] Field of Search ................................... 358/400, 404, 358/434–436, 438–440, 442, 444, 468; 370/466, 467; H04N 1/00, 1/32

[56] References Cited

U.S. PATENT DOCUMENTS

| | | |
|---|---|---|
| 4,841,375 | 6/1989 | Nakajima et al. ..................... 358/404 |
| 5,241,403 | 8/1993 | Ishikawa ............................... 358/440 |
| 5,696,606 | 12/1997 | Sakayama et al. ..................... 358/468 |
| 5,726,768 | 3/1998 | Ishikawa et al. ....................... 358/468 |

*Primary Examiner*—Kim Yen Vu
*Attorney, Agent, or Firm*—Loeb & Loeb, LLP

[57] ABSTRACT

The facsimile machine connected with a personal computer such that it can send image data to the personal computer. The facsimile machine first requests the personal computer to supply data about communication capability of the personal computer such as resolution mode (scanning line density) and coding method to the personal computer. Upon this request, the personal computer outputs necessary data to the facsimile machine. If a user of the facsimile machine sets to scan the image at a resolution finer than a resolution of the personal computer, then resolution is automatically changed to a rougher resolution to conform with the personal computer. The facsimile machine then scans the image at the modified resolution. The scanned image is coded by the same coding method as the personal computer. The image scanned and coded in line with the communication capability of the personal computer is then stored in a memory and transmitted to the personal computer from the memory.

19 Claims, 5 Drawing Sheets

FACSIMILE MACHINE HAVING RESOLUTION COMPATIBLE WITH DATA TERMINAL DEVICE

BACKGROUND OF THE INVENTION

1. Technical Field

The present invention relates to a facsimile machine to which a data terminal device such as a personal computer is connected.

2. Background Art

Facsimile machines are able to send and receive arbitrary image data to and from a remote communication device so that they are widely used in offices and homes. On the other hand, data terminal devices such as personal computers having many functions are also developed. In recent years, a personal computer is connected to a facsimile machine as a data terminal device to provide a facsimile-personal computer system. In this combined system, the facsimile machine and personal computer are operable in a cooperative manner.

In this facsimile-personal computer system, the facsimile machine can function as a scanner for the personal computer if it is used to scan an image and send it to the personal computer. The personal computer then modify or process the image data. The facsimile machine can also function as a printer for the personal computer if it is used to receive image data from the personal computer, which image data is prepared by the personal computer, and print it on a recording sheet. The facsimile machine can further function as a modem for the personal computer if it is used to receive and send image data from and to a remote communication device since the facsimile machine is connected to the remote communication device via a communication line and is able to perform facsimile communication between the remote communication device and itself.

When the above described conventional facsimile machine is used as a scanner for the data terminal device such as a personal computer, communication capability of the personal computer (e.g., how the personal computer receives data from the associated facsimile machine) is generally unknown. Accordingly, the conventional facsimile machine has the following problems.

Before sending image data to the personal computer from the facsimile machine, the facsimile machine scans the image, codes it, stores it in its memory, and conducts handshaking with the personal computer to confirm communication capability of the personal computer. Therefore, if scanning resolution (or scanning line density) of the facsimile machine is finer than the communication capability of the personal computer (e.g., if the facsimile machine scans the image at high resolution but the personal computer does not have such a high resolution), the data form should be adjusted to a lower resolution before data transmission to the personal computer so that it conforms with the communication capability of the personal computer.

Specifically, if the facsimile machine scans the image at a superfine mode (15.4 lines/mm line density) but the personal computer only has a fine mode (3.85 lines/mm line density), then the image which has been scanned, coded and stored by the facsimile machine should be coded again such that the image data to be transmitted matches the resolution of the personal computer. Thus, the processing for image data transmission to the personal computer is complicated and time consuming.

SUMMARY OF THE INVENTION

The present invention was developed in consideration of the above problems of the conventional facsimile machine, and an object of the present invention is to provide a facsimile machine which can send an image to a data terminal device in an effective manner by knowing communication capability of the data terminal device beforehand.

According to one aspect of the present invention, there is provided a facsimile machine of a type which is connectable with a data terminal device and which is able to scan an image, code resulting image data, store the coded image data in a memory and send the coded image to the data terminal device from the memory, characterized in that the facsimile machine includes storage means for storing data about communication capability of the data terminal device and control means for scanning the image and coding the image data based on the data about the communication capability of the data terminal device stored in the storage means.

The data about the communication capability of the data terminal device is first stored in the storage means. After that, the data scanning and coding are carried out using this data. Specifically, image scanning by the facsimile machine is carried out at the same scanning resolution (line density) as the data terminal device if the scanning resolution of the facsimile machine is finer than the data terminal device, and the image data coding is carried out by the same coding method as the data terminal device if the coding method of the facsimile machine is an advanced one (or more complicated one) than the data terminal device. Therefore, it is unnecessary to convert the image data to another data form compatible with the data terminal device after storing the image data in the memory of the facsimile machine even if the data receiving device (data terminal device) has an inferior communication capability than the data sending device (facsimile machine of the invention). As a result, the processing for the data transmission to the data terminal device is simplified and the time required for data transmission is reduced as compared with the conventional facsimile machine. The communication capability of the data terminal device is capability used for communication with the facsimile machine of the invention and it includes, for example, coding capability and recording capability as described above.

If there is no data about the communication capability of the data terminal device in the storage means, the control means may automatically request the data terminal device to supply such data. After acquiring the necessary data from the data terminal device and storing it in the storage means, the facsimile machine scans the image according to the known communication capability of the data terminal device.

If communication capability of the facsimile machine is superior to that of the data terminal device, the process from the data scanning to the data storage into the memory is carried out based on the communication capability of the data terminal device. Therefore, the data transmission to the data terminal device from the memory of the facsimile machine requires no modification even if the sending and receiving devices have different communication capabilities. In general, the facsimile machine possesses a higher performance. In such a case, the image scanning is automatically performed according to the performance of the data terminal device (by using a rougher resolution and a less complicated coding method). No matter how the image scanning manner and coding method are set by a user or the facsimile machine, these are changed to conform with the communication capability of the data terminal device if the communication capability of the facsimile machine is superior to that of the data terminal device.

Additional objects, aspects and advantages of the present invention will become apparent to those skilled in the art to which the invention relates from the following detailed description of preferred embodiments and the appended claims as read in conjunction with the accompanying drawings.

BRIEF DESCRIPTION OF THE ACCOMPANYING DRAWINGS

DETAILED DESCRIPTION OF THE PREFERRED EMBODIMENTS

Now, a preferred embodiment of the present invention will be described with reference to the accompanying drawings.

Figure 2:
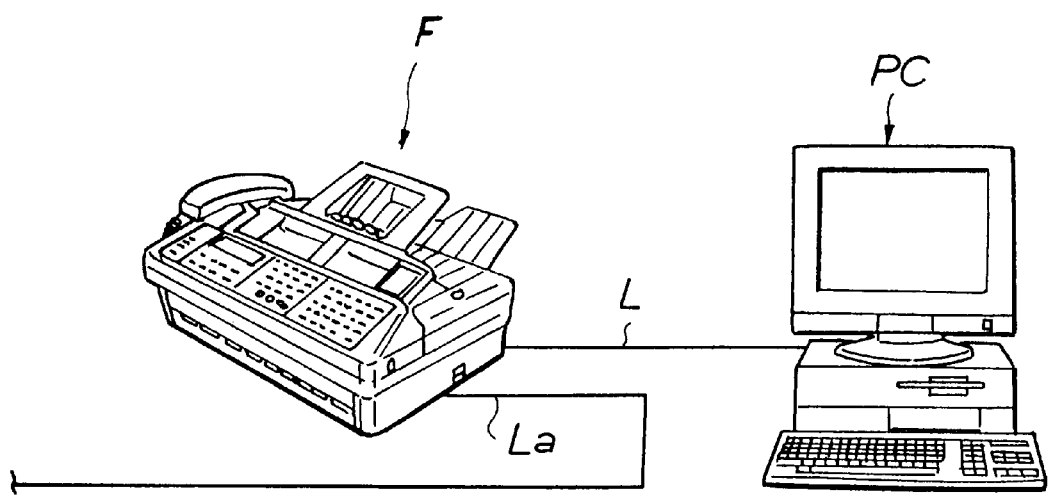
FIG. 2 is a perspective view of a communication system including the facsimile machine shown in FIG. 1 and a personal computer.

Referring to FIG. 2, illustrated is a schematic diagram of a communication system including a facsimile machine F of the invention and a personal computer PC. The facsimile machine F is connected to the personal computer PC (i.e., data terminal device) via a communication line L according to RS-232C standard, for example, and connected to a telephone line or network via another communication line La. The facsimile machine F of this facsimile-personal computer system can perform facsimile data communication via the telephone line La and can serve as a modem, printer and scanner for the personal computer PC.

It should be noted that the data terminal device is not limited to the personal computer PC, but it may be any suitable communication device as long as it can communicate with the facsimile machine F. For instance, a communication device which operates on a standard protocol of Asynchronous Facsimile DCE Control Standard Service Class 1 (simply referred to as "Service Class 1") (EIA/TIA-578) may be employed. In Service Class 1, the data terminal device defines a command to set and control the facsimile machine F and a response which the facsimile machine F outputs in response to this command, and the command and response are serially exchanged through the communication line L to enable data transmission to the facsimile machine F from the data terminal device PC and vice versa.

Figure 1:
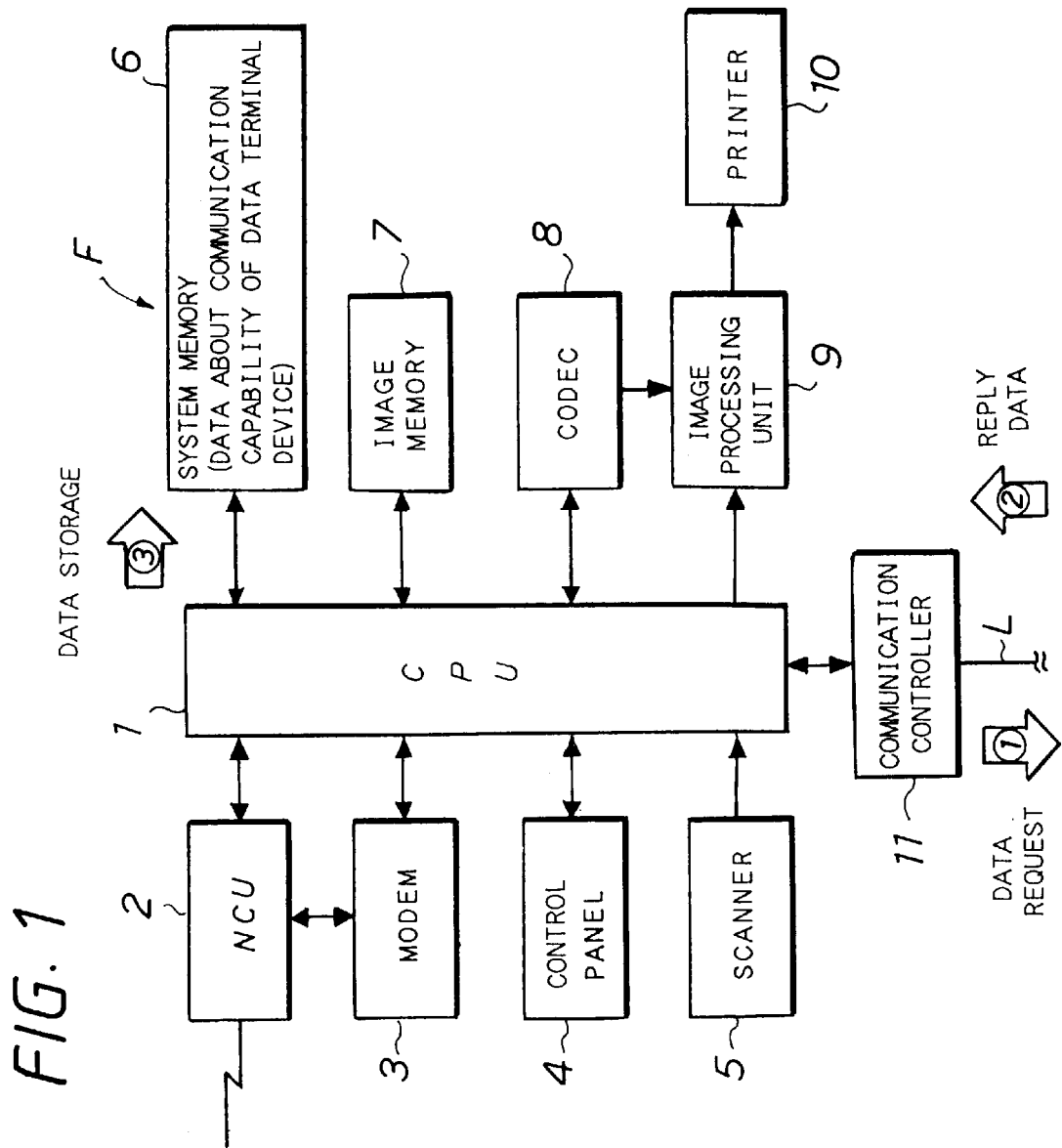
FIG. 1 is a block diagram showing major parts of a facsimile machine according to the present invention.

Referring now to FIG. 1, illustrated is an example of a basic configuration of the facsimile machine F. A reference numeral 1 denotes CPU for various signal controlling, 2 NCU for sending a dialing signal to the communication line La, 3 a modem for modulating and demodulating signals to receive and send facsimile image data from and to a remote facsimile machine (not shown), 4 a control panel including various operation switches and keys such as numeric keys as well as a display unit such as LCD, 5 a scanner for scanning a document (or an image) to be transmitted to the remote facsimile machine via the line La or to the personal computer PC via the line L, 6 a system memory including ROM for storing programs used by CPU and RAM for temporarily storing various data, 7 an image memory for storing image data sent from the personal computer PC via the communication line L, image data sent from the remote facsimile machine via the telephone line La and image data scanned by the scanner 5, 8 a codec for coding and decoding the image data according to MH or MR method, 9 an image processing unit for applying a resolution change process, a size reduction/magnification process and a smoothing process to the image data after decoding by the codec 8, 10 a printer for printing the image data on a recording sheet, and 11 a communication controller for controlling communication between the personal computer PC and facsimile machine F via the communication line L according a predetermined protocol.

An initial setting of the facsimile machine F is performed by signals supplied from the personal computer PC via the communication controller 11.

In a normal mode, if the facsimile machine F receives data from a remote facsimile machine via the telephone line La, the data is simply transferred to the personal computer PC, and if the facsimile machine F receives data from the personal computer PC, the data is transmitted to a designated destination via the telephone line La after making a call based on dialing data about a facsimile number of the destination sent from the personal computer PC. If the facsimile machine F scans an image by its scanner 5, the data is coded by the codec 8, stored in the image memory 7 and sent to the personal computer PC from the image memory 7.

In the present invention, the communication capability of the personal computer PC is already known before handshaking is conducted in a series of data transmission processes. The communication capability of the personal computer PC is capability needed to communication with the facsimile machine F (i.e., data reception capability of a communication software loaded in the personal computer PC), which includes a coding method and a processing capability in recording such as a line density.

CPU 1 makes a request to the personal computer PC via the communication controller 11 to know communication capability of the personal computer PC as a user of the facsimile machine F operates a particular key on the control panel 4 (unshaded arrow (1)). Upon this request, the personal computer PC sends data about its communication capability to the facsimile machine F (unshaded arrow (2)). This data is then stored in, for example, RAM of the system memory 6 (unshaded arrow (3)). The facsimile machine F conducts communication with the personal computer PC using this data.

As described above, when the personal computer PC is connected to the facsimile machine F for the first time, the facsimile machine F once asks the personal computer PC to send the communication capability data to the facsimile machine F. The facsimile machine F stores this data and utilizes it in subsequent data transmission to the personal computer PC. Therefore, even if communication capability of the personal computer PC is different from that of the facsimile machine F, processing for the data transmission is carried out in conformity with the communication capability of the personal computer PC. In other words, it is unnecessary for the facsimile machine F to change the data form after storing the image data in the image memory 7 or after handshaking with the personal computer PC.

In the illustrated embodiment, the facsimile machine F obtains the communication data about the personal computer PC according to a normal hand shaking process (T-30) upon operation of the control panel 4. It should be noted, however, that particular commands may be used to conduct the data request (1) and reply (2).

Figure 3:
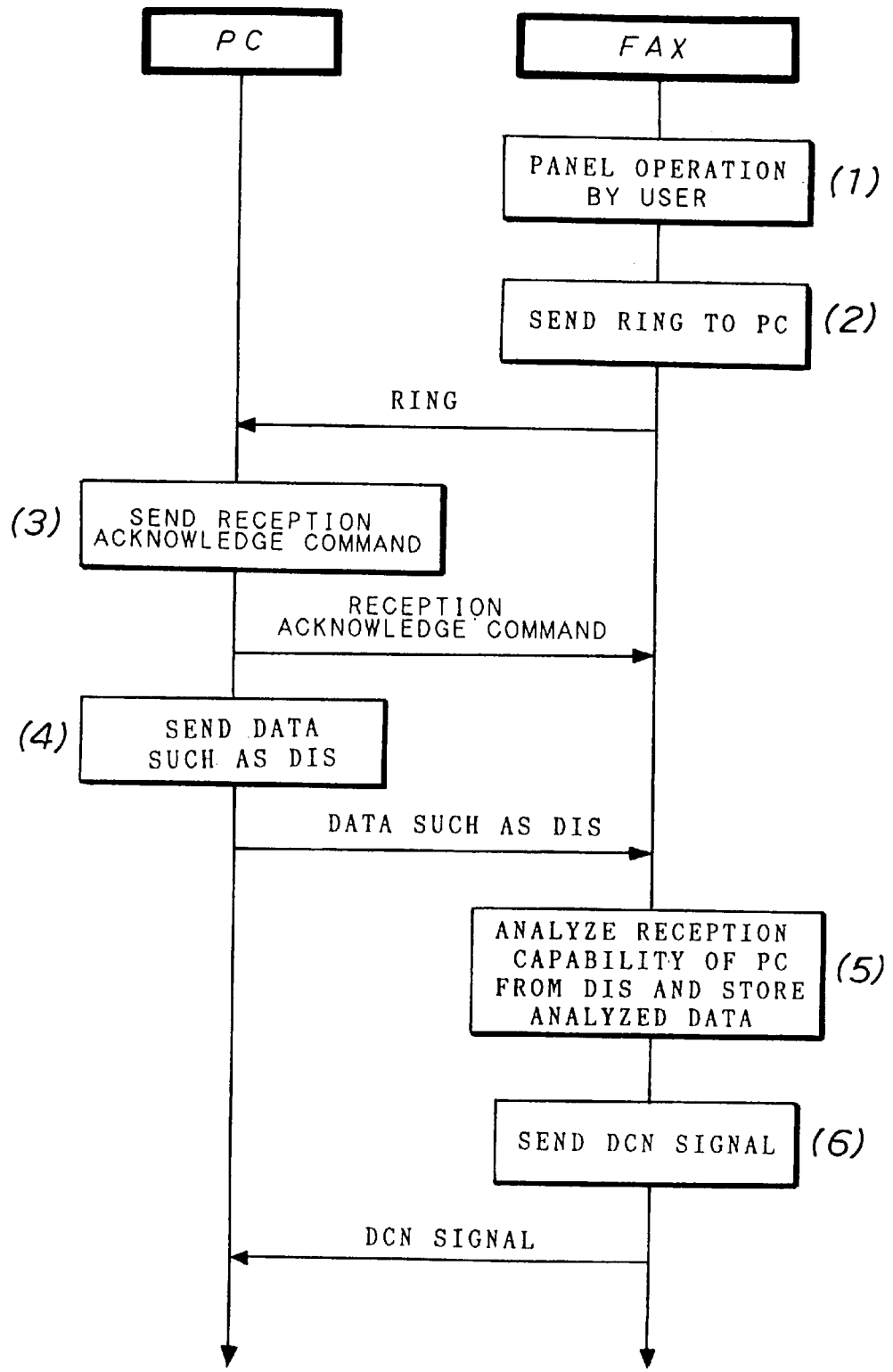
FIG. 3 is a diagram illustrating a series of operations performed by the facsimile machine and personal computer with data and signals exchanged to determine communication capability of the personal computer.
Figure 4:
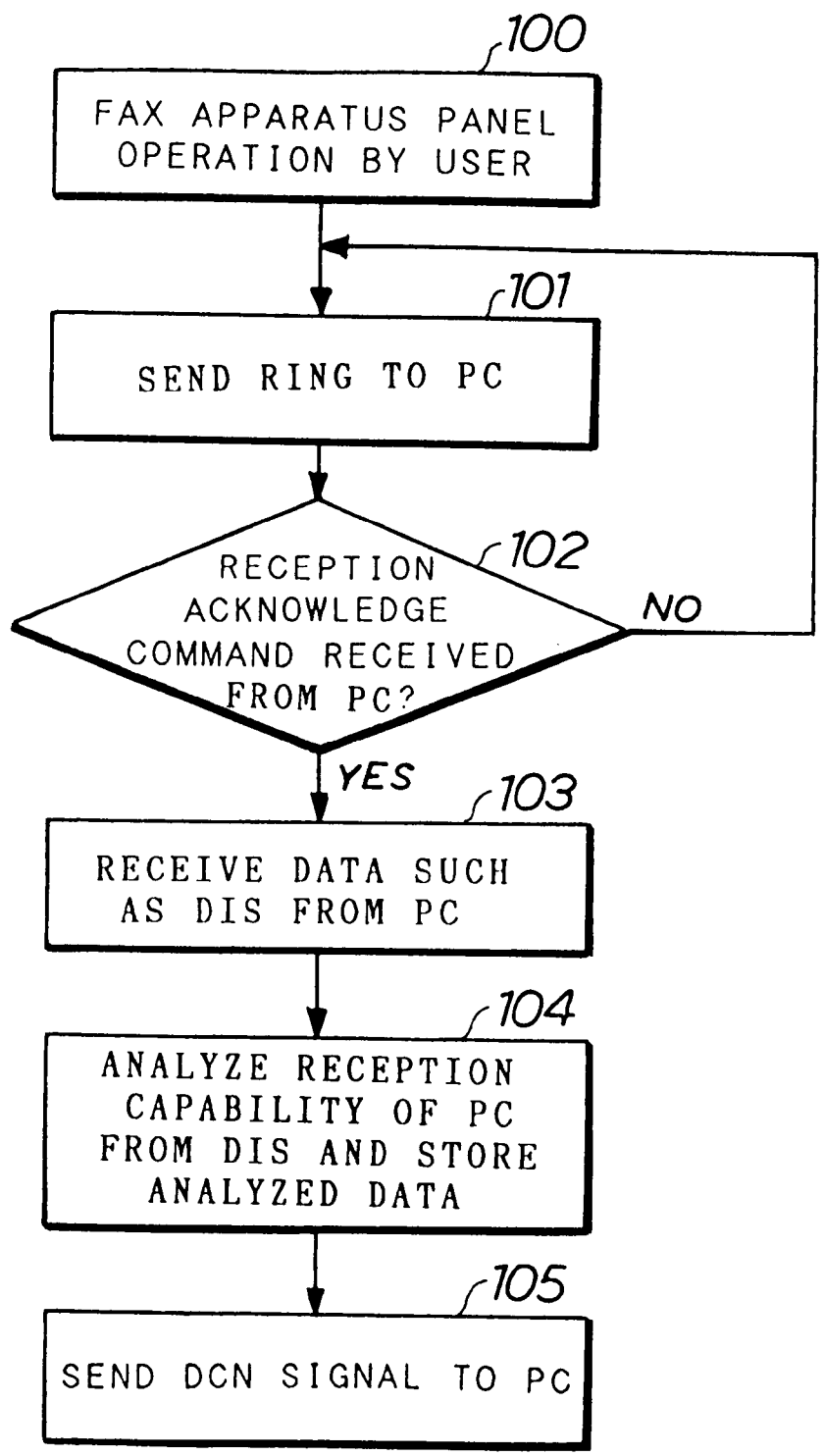
FIG. 4 is a flowchart showing the operations of the facsimile machine which corresponds to the diagram of FIG. 3.

FIG. 3 illustrates a series of processing (1) to (6) executed by the facsimile machine F and personal computer PC with signals and data exchanged between the facsimile machine F and personal computer PC to acquire the data about the communication capability of the personal computer PC. This is conducted before the image data is transmitted to the personal computer PC from the facsimile machine F. FIG. 4 illustrates a flowchart for the facsimile machine F (Steps 100 to 105) operating in accordance with the diagram shown in FIG. 3.

As a user operates the control panel 4, the facsimile machine F makes a call to the personal computer PC (RING). Upon receiving the call, the personal computer PC outputs a reception acknowledge signal or command and subsequently various data such as CSI (Called Subscriber Identification) and DIS (Digital Identification Signal). Using DIS, the facsimile machine F analyzes a coding method (MH, MR or the like), line density (normal, fine or superfine), a communication speed and the like, and stores analyzed data in the system memory 6. Then, the facsimile machine F sends DCN (Disconnection) signal to automatically terminate this process.

It should be noted that the timing when the facsimile machine F acquires the data about the communication capability of the personal computer is not limited to upon the user's operating the control panel 4. For example, if there is no data in the system memory 6 about the communication capability when the scanner 5 scans a document to be sent in the form of image data to the personal computer PC, then the facsimile machine F automatically may start the above described communication capability data acquisition process.

In this manner, the communication performance of the personal computer PC is known upon manual operation of the control panel 4 or automatically before the facsimile machine F starts the image data scanning. This is particularly useful when the data is stored once in the memory 7 of the facsimile machine F before transmitted to the personal computer PC. Specifically, by sending a request to the personal computer PC about the communication capability data prior to image data scanning, the facsimile machine F can scan and code the image data in conformity to the communication capability of the personal computer PC and store it in the image memory 7. Unlike the conventional facsimile machine, therefore, the facsimile machine of the present invention will not need to reformat the scanned image data stored in the image memory 7 in order to step down to the PC's communication capability.

If it is determined from the series of operations shown in FIG. 3 that the illustrated facsimile machine F of the present invention F has a superior communication capability than the personal computer PC, then data transmission to the personal computer PC from the facsimile machine F is carried out according to the communication capability of the personal computer PC.

Figure 5:
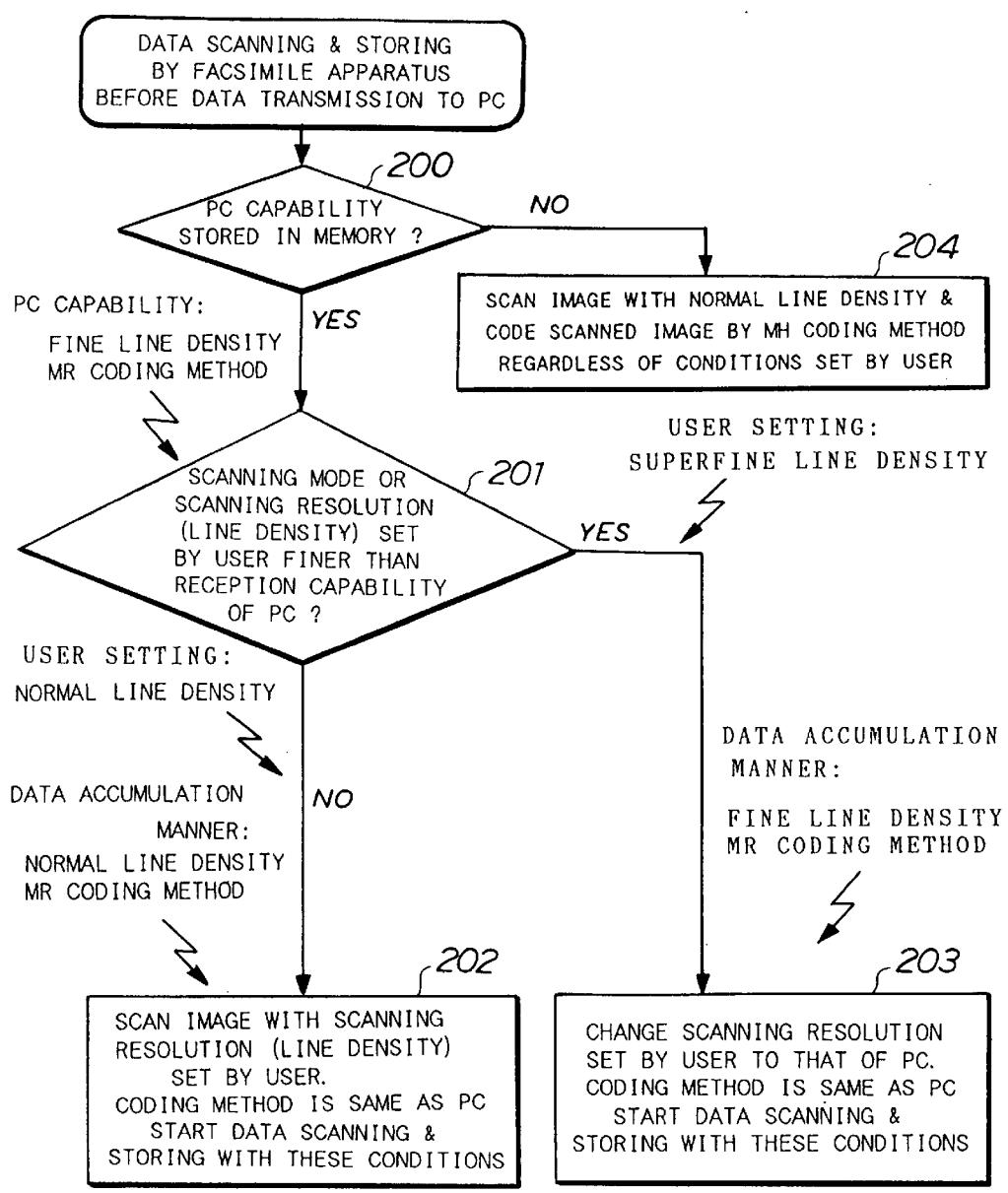
FIG. 5 is a flowchart of another series of operations executed by the facsimile machine to illustrate how communication capability of the facsimile machine of the invention is adjusted in view of communication capability of the data terminal device prior to image scanning.

A series of operations executed by the facsimile machine F to start the image scanning with an appropriate scanning mode or resolution and the coding by an appropriate coding method is illustrated in the flowchart of FIG. 5 (Steps 200 to 204) using a concrete example.

In FIG. 5, it should be assumed that the personal computer PC has the following capability: line density is fine and the coding method is MR method. On the other hand, the facsimile machine F is able to scan an image with the normal or superfine line density.

If the line density of the facsimile machine F is set to normal by a user, the line density of the personal computer PC (i.e., fine) is finer than normal so that the communication capability of the facsimile machine F is not superior to that of the personal computer PC. In this case, the scanning line density is not changed from normal since it is not beyond the communication capability of the personal computer PC. The scanning by the scanner 5 is performed according to MR coding method since it is the coding method of the personal computer PC. After image scanning and coding, the image data is stored in the image memory 7.

If the user selects a superfine mode, the communication capability of the facsimile machine F is superior to that of the personal computer PC in line density. In such a case, the image scanning is performed in line with the line density of the personal computer PC (i.e., fine mode). In short, the line density is changed to fine from superfine. The coding method employed by the scanner 5 is MR since this is the coding method of the personal computer PC. After scanning and coding under these conditions, the image data is stored in the image memory 7.

After stored in the image memory 7, the image data is sequentially read out or retrieved from the image memory and transmitted to the personal computer PC via the communication controller 11. Since the image data already conforms to the communication capability of the personal computer PC, it is not necessary to convert the image data to a particular form after reading out from the image memory 7.

If the communication capability of the personal computer PC is not stored in the system memory 6, the line density is set to normal and the MH coding method is used in the scanning process regardless of the scanning mode and coding method setting made by the user or facsimile machine F (Step 204). The normal line density and MH coding method are the least or minimum communication capability which any personal computers possess. Therefore, the image data to be transmitted to the personal computer PC does not need any conversion when transmitted to the personal computer PC from the image memory 7 of the facsimile machine F.

What is claimed is:

1. A facsimile machine connected with a data terminal device such that it can scan an image, store the image in a memory and send the image to the data terminal device from the memory, the facsimile machine being adapted to operate on one of a plurality of series of predetermined processes from image scanning to image storage, the facsimile machine comprising:

storage means for storing data about communication capability of the data terminal device including resolution for image scanning and data storing; and control means for selecting one of the plurality of series of predetermined processes based on the data about the communication capability of the data terminal device stored in the storage means and for causing the facsimile machine to operate on the selected series of processes, stored data being sent to the data terminal device without resolution conversion.

2. The facsimile machine of claim 1, wherein if there is no data about the communication capability of the data terminal device in the data storage means, the control means requests the data terminal device to supply the communication capability data and stores it in the storage means.

3. The facsimile machine of claim 1, wherein if communication capability of the facsimile machine is superior to the communication capability of the data terminal device, the control means selects one of the plurality of series of processes which conforms with the communication capability of the data terminal device.

4. The facsimile machine of claim 1, wherein the communication capability includes line density for image scanning and a coding method.

5. The facsimile machine of claim 2, wherein the communication capability includes line density for image scanning and a coding method.

6. The facsimile machine of claim 3, wherein the communication capability includes line density for image scanning and a coding method.

7. The facsimile machine of claim 6, wherein if the scanning line density of the facsimile machine is finer than the scanning line density of the data terminal device, the control means causes the facsimile machine to scan the image at the scanning line density of the date terminal device.

8. The facsimile machine of claim 6, wherein if a coding method of the facsimile machine is more complicated than that of the data terminal device, the control means causes the facsimile machine to code the image by the coding method of the data terminal device.

9. The facsimile machine of claim 1, wherein if there is no data about the communication capability of the data terminal device in the data storage means, the control means causes the facsimile machine to scan the image in a normal mode and to code the image data by MH method.

10. The facsimile machine of claim 1, wherein the data terminal device is a personal computer.

11. A facsimile machine connected with a data terminal device such that it can send an image to the data terminal device, comprising:

first data acquisition means for acquiring first data about resolution or scanning line density of the data terminal device;

a scanner for scanning the image to provide image data from the scanned image;

first control means for causing the scanner to scan the image at the resolution or line density acquired by the first data acquisition means or a predetermined resolution or line density depending upon comparison of the first data with the predetermined resolution or line density;

coding means for coding the image data by a predetermined coding method;

a memory for storing the coded image data; and data transmission means for sending the coded image data to the data terminal device from the memory;

the acquiring of first data by the first data acquisition means occurring in response to a request made to the data terminal device independently of sending of the coded image data to the data terminal device by the data transmission means.

12. The facsimile machine of claim 11 further including:

second data acquisition means for acquiring a coding method which the data terminal device employs; and second control means for causing the coding means to code the image data by the coding method acquired by the second data acquisition means or by the predetermined coding method depending upon comparison of the coding method known by the second data acquisition means with the predetermined coding method.

13. The facsimile machine of claim 11, wherein if the resolution or scanning line density of the data terminal device as acquired by the first data acquisition means is rougher than the predetermined resolution or scanning line density of the scanner, the first control means causes the scanner to scan the image at the resolution or scanning line density acquired by the first data acquisition means.

14. The facsimile machine of claim 12, wherein if the predetermined coding method of the coding means is more complicated than the coding method of the data terminal device as acquired by the second data acquisition means, the second control means causes the coding means to code the image data by the coding method as acquired by the second data acquisition means.

15. The facsimile machine of claim 11, wherein the first data acquisition means acquires the first data before handshaking with the data terminal device.

16. The facsimile machine of claim 12, wherein the second data acquisition means acquires the coding method of the data terminal device before handshaking with the data terminal device.

17. The facsimile machine of claim 11, wherein the data terminal device is a personal computer.

18. The facsimile machine of claim 11, wherein the first data acquisition acquires the first data from a digital identification signal (DIS) sent from the data terminal device.

19. The facsimile machine of claim 12, wherein the second data acquisition acquires the coding method of the data terminal device from a digital identification signal (DIS) sent from the data terminal device.

* * * * *